UNITED STATES PATENT OFFICE.

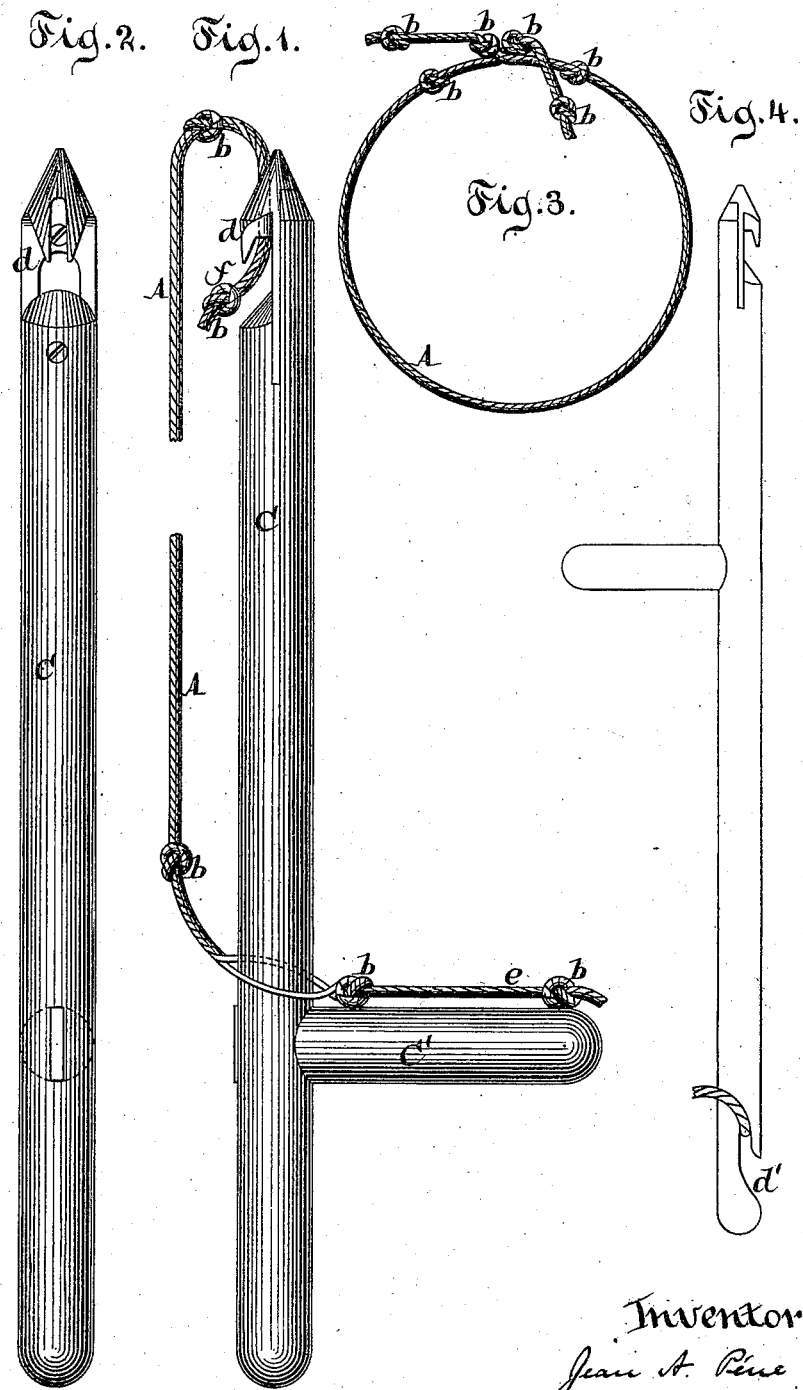

JEAN A. PÉNE, OF PARIS, FRANCE.

IMPROVEMENT IN INSTRUMENTS FOR BINDING GRAIN.

Specification forming part of Letters Patent No. 197,888, dated December 4, 1877; application filed November 2, 1877.

*To all whom it may concern:*

Be it known that I, JEAN A. PÉNE, of Paris, in the Republic of France, have invented a new and useful Improvement in Devices for Binding Grain and other Materials, which improvement is fully set forth in the following specification, reference being had to the accompanying drawing, in which—

Figure 1 illustrates the manner of using my device. Fig. 2 is a front view of the binding implement. Fig. 3 is a plan view of the band, illustrating the manner in which the ends thereof are fastened together; and Fig. 4 is a side view of a modification of the binding implement.

Similar letters indicate corresponding parts.

My invention relates to an improved device for binding sheaves or bundles of grain with a band, which is formed of two or more strands of hemp or other flexible material, and provided with stops near its opposite ends, these stops being so formed that the strands are thereby united at the points where they are located in such a manner that by placing the band around a bundle or sheaf, and drawing one end thereof between the strands, and adjacent to one of the stops, near its opposite end, then tightening the band, and causing or permitting one of the stops near each end to come in contact with the other, the two ends of the band are securely fastened together. The implement for fastening together the two ends of the band described is composed of an elongated handle and an inwardly-projecting hook arranged at one end of said handle, so that by placing the handle between the strands, near one end of the band, then catching or inserting one of the stops near the opposite end thereof in the hook, and withdrawing the handle, one end of the band is drawn between the strands at its opposite end, and the band is tightened, as hereinafter more fully described.

In the drawing, the letter A designates the band, which, in the example shown, is formed of two strands, which are preferably twisted together in the manner of a rope, and which can be made of hemp, leather, or any other flexible material. *b* are stops located near the opposite ends of said band, and which are so formed as to unite its strands at the points where they are located. I prefer to form these stops *b* by simply knotting the band at the desired points, as shown.

In order to fasten the two ends of the band A together, one end thereof is simply drawn between the strands near its opposite end, and one of the stops *b* at each end is caused to come in contact with the other, as shown in Fig. 3, a portion of the strands being loosened, when they are twisted together, to permit of thus drawing the end of the band between them, while they retwist themselves after this is accomplished.

The letter C designates an elongated handle, and *d* is an inwardly-projecting hook, composing the implement which I have devised for fastening the two ends of the band A together, the application of this implement being as follows:

The band A is placed around the sheaf or bundle to be bound, and the handle C is forced between the strands composing the band, near one end thereof, (marked *e*,) and adjacent to one of the stops *b*, as seen in Fig. 1, the end *e* of the band being held by the same hand in which the handle is held. One of the stops *b*, near the other end of the band, (marked *f*,) is then caught or inserted in the hook *d*, and the handle C is withdrawn from between the strands, by which operation the band can be tightened, and the end *f* thereof is drawn between that portion of the strands vacated by the handle. The stop confined in the hook *d* is then released, whereupon, by the strain to which the band is subjected by the expansion of the sheaf or bundle, one of the stops *b* at each end thereof is caused to come in contact with the other, and thereby the ends *e* and *f* are securely held or fastened together.

The handle C is provided with a lateral projection, C', to facilitate the holding of the end *e* of the band, and serving as a stop for the loop of the cord.

The hook *d* can be made in one piece with the handle C; or it can be made separately, and affixed to the handle in any suitable way. Said hook, moreover, may be doubled, as in the example shown in Figs. 1 and 2; or it may be of single form, as shown at $d'$ in Fig. 4.

What I claim as new, and desire to secure by Letters Patent, is—

The grain-binder consisting of the staff C, having at one end the slotted hook $d$, and provided with the cross-piece C', serving as a stop for the cord-loop, substantially as described.

J. A. PÉNE.

Witnesses:
  W. BONNEVILLE,
  W. H. DANBERRY.